UNITED STATES PATENT OFFICE.

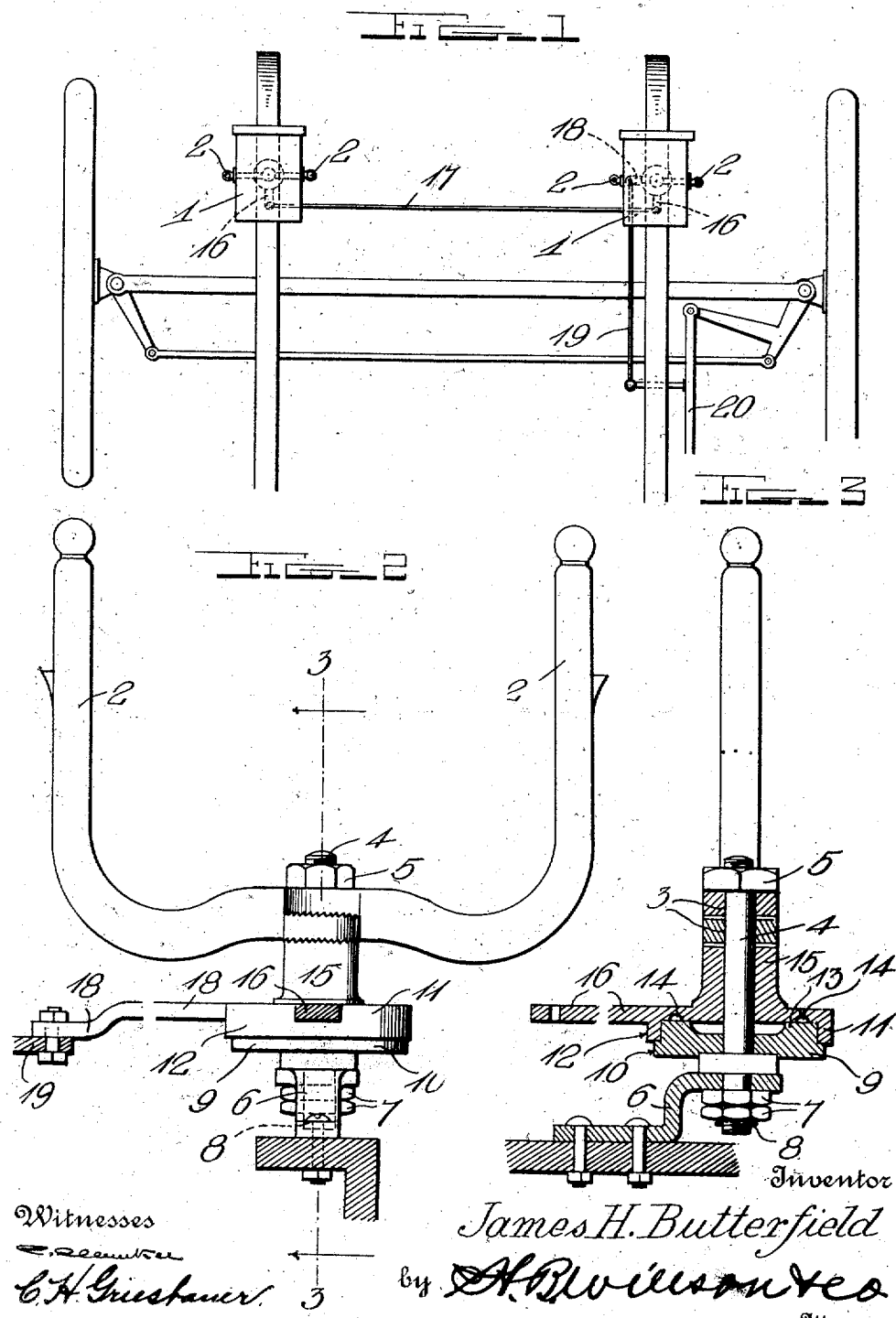

JAMES H. BUTTERFIELD, OF LOGAN, OHIO.

AUTOMATIC LAMP-OPERATING MECHANISM FOR AUTOMOBILES.

980,062. Specification of Letters Patent. Patented Dec. 27, 1910.

Application filed June 20, 1910. Serial No. 567,892.

*To all whom it may concern:*

Be it known that I, JAMES H. BUTTERFIELD, a citizen of the United States, residing at Logan, in the county of Hocking and State of Ohio, have invented certain new and useful Improvements in Automatic Lamp-Operating Mechanism for Automobiles; and I do declare the following to be a full, clear, and exact description of the invention, such as will enable others skilled in the art to which it appertains to make and use the same.

This invention relates to improvements in operating devices for the lamps of automobiles or other road vehicles.

The object of the invention is to provide a lamp operating device adapted to be connected with the steering mechanism of an automobile whereby the lamps will be turned by said mechanism to throw the light in the direction in which the vehicle is steered.

With the foregoing and other objects in view, the invention consists of certain novel features of construction, combination and arrangement of parts as will be more fully described and particularly pointed out in the appended claims.

In the accompanying drawings, Figure 1 is a plan view of a portion of an automobile showing the application of the invention. Fig. 2 is a front view of one of the lamps and its supporting bracket. Fig. 3 is a vertical sectional view of the same.

Referring more particularly to the drawings 1 denotes the lamps which may be of any suitable construction and are connected in the usual or any suitable manner to supporting forks 2. The forks 2 have, formed in their notched, overlapping inner ends, slots 3 which are engaged with a connecting bolt 4, on which is arranged a clamping nut 5 whereby the ends of said forks are rigidly clamped together. By thus mounting the forks 2 they may be adjusted laterally to receive lamps of different sizes. The forks 2 are secured to the machine by suitable brackets 6 which are fastened to any suitable part of the frame or running gear of the machine and are adapted to receive the lower ends of the bolts 4 as shown. The lower ends of the bolts 4 are secured in the brackets by lock nuts 7 which are prevented from unscrewing or losing off the ends of the bolts by cotter pins 8 or other forms of nut locking devices. Secured to the bolts 4 above the brackets 6, is the stationary member 9 of a bearing said bearing comprising a circular disk or plate having formed on its outer ends an annular flange 10. With the stationary member 9 of the bearing is revolubly engaged an upper movable member 11 which is in the form of a disk or plate and is provided around its outer edge with a bearing flange 12 which fits onto the upper end of the lower member or disk 9 of the bearing and engages the upper surface of the flange 10 of said lower member. The inner portion of the upper side of the lower or stationary bearing member 9 is recessed, thus forming an outer annular bearing ring or surface 13 which engages the inner surface of the upper bearing member as shown. In the inner surface of the upper bearing member engaged by the bearing ring 13, is formed an annular oil groove 14 which is adapted to retain oil whereby the parts are properly lubricated.

In the upper side of the upper bearing member 11 is integrally formed an upwardly projecting boss 15 which is preferably provided with a roughened or serrated upper surface which engages a similarly formed surface on the under side of one of the brackets 2. The engaging surfaces of the slotted or notched inner ends of the brackets are also preferably serrated or roughened whereby a firm engagement may be had between these parts to prevent the turning the same on the bolts 4 when the upper movable member 11 of the bearing is turned. On the movable members 11 of the bearings are formed rearwardly projecting crank arms 16 which are connected by a connecting rod 17 whereby when one of the lamps is turned in either direction the same movement will be imparted to the lamp at the opposite side of the machine.

On the movable member 11 of the bearing of one of the lamps is formed a crank arm 18, said arm projecting at right angles to the arm 16 as shown. The crank arm 18 is connected by an operating rod 19 to the steering rod 20 or other movable part of the steering apparatus whereby, when said rod is moved to turn the front steering wheels in either direction the lamps will be turned in the same direction thus throwing the light in the direction in which the machine is steered.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim is:

1. In a lamp operating mechanism for vehicles, the combination of pairs of lamp supporting forks, a stationary bearing member, a supporting bracket arranged under said member, a rotatable bearing member resting on and rising from said stationary member, the lamp supporting forks being engaged over and resting upon said rotatable member, a bolt extending through said bracket, bearing members and forks, a clamping nut on said bolt engaging said forks to secure the same against movement relative to the bolt, means connecting the movable bearing members of the lamp supporting forks, and means to connect the bearing member of one of said forks to the steering mechanism of the vehicle.

2. In a lamp operating mechanism for vehicles, pairs of lamp supporting forks each comprising laterally adjustable slotted arms, a stationary bearing member, a supporting bracket therefor, said member having an annular flange, a rotatable bearing member having an annular flange disposed upon the flange of said stationary member, said rotatable member having an oil receiving groove in its under surface, a bolt extending through said bracket, bearing members and the slots of said fork arms, a clamping nut on one end of said bolt engaging said arms to secure the same against relative movement, means connecting the movable bearing members of the lamp supporting forks, and means to connect the movable bearing member of one of said forks to the steering mechanism of the vehicle.

In testimony whereof I have hereunto set my hand in presence of two subscribing witnesses.

JAMES H. BUTTERFIELD.

Witnesses:
 BERTYE P. CORRELL,
 ETTA B. PHILLIPS.